United States Patent
Shih et al.

(10) Patent No.: US 8,264,467 B2
(45) Date of Patent: Sep. 11, 2012

(54) HANDHELD ELECTRONIC APPARATUS AND TOUCH PANEL THEREOF

(75) Inventors: Chin Chung Shih, Taoyuan County (TW); Hsueh Lin Lu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 941 days.

(21) Appl. No.: 12/119,767

(22) Filed: May 13, 2008

(65) Prior Publication Data

US 2009/0033634 A1 Feb. 5, 2009

Related U.S. Application Data

(60) Provisional application No. 60/953,876, filed on Aug. 3, 2007.

(51) Int. Cl.
*G06F 3/045* (2006.01)
*H05K 5/02* (2006.01)

(52) U.S. Cl. ......................................... 345/173
(58) Field of Classification Search .................. 345/173, 345/169
See application file for complete search history.

(56) References Cited

U.S. PATENT DOCUMENTS

| | | | |
|---|---|---|---|
| 6,728,519 B1 * | 4/2004 | Okuda | 455/90.3 |
| 2004/0041796 A1 | 3/2004 | Lee | |
| 2007/0181456 A1 * | 8/2007 | Kusuda et al. | 206/443 |

FOREIGN PATENT DOCUMENTS

| | | |
|---|---|---|
| CN | 1902571 A | 1/2007 |
| JP | 2001102763 | 4/2001 |
| JP | 2001168546 | 6/2001 |
| WO | 2005064451 | 7/2005 |

OTHER PUBLICATIONS

Chinese Office Action dated Jun. 2, 2011 for 200710166450.8, which is a corresponding Chinese application, that cites CN 1902571A.
Japanese Office Action dated Mar. 15, 2011 for 2008-178865, which is a Japanese counterpart application, that cites WO2005064451.
Decision of Rejection issued on Jan. 10, 2012 for the Japanese counterpart application 2008-178865.
Listed above: JP2001102763, published on Apr. 13, 2001, is the US counterpart application US6,728,519.

* cited by examiner

*Primary Examiner* — Amare Mengistu
*Assistant Examiner* — Jennifer Zubajlo
(74) *Attorney, Agent, or Firm* — Jianq Chyun IP Office

(57) ABSTRACT

A handheld electronic apparatus comprises a touch panel, a front cover and a display panel. The front cover has a support portion with a first opening. The touch panel is placed on the support portion and covers the first opening. The touch panel comprises a touch panel body and a flexible printed circuit (FPC). The touch panel body has a first substrate having a notch configured to accommodate one end of the flexible printed circuit connected to the touch panel body. When the touch panel is assembled with the front cover, the flexible printed circuit will not be too-sharply bent due to the notch design.

15 Claims, 4 Drawing Sheets

HANDHELD ELECTRONIC APPARATUS AND TOUCH PANEL THEREOF

BACKGROUND OF THE INVENTION (A) Field of the Invention

The present invention is related to an electronic apparatus, and more specifically, to a handheld electronic apparatus and the touch panel thereof.

(B) Description of Related Art

A traditional Personal Digital Assistant (PDA) usually uses a touch panel as an input interface. As wireless network technology progresses, traditional cellular phones using keys for input no longer meet the demand of users. Therefore, an advanced cellular phone with a touch panel as the interface was introduced recently, and provided a brand new communication feeling.

FIG. 1 illustrates a cross-sectional view of a cellular phone with a traditional touch panel. Referring to FIG. 1, a cellular phone with touch panel 10 comprises a touch panel 11, a front cover 12, a display panel 16 and a rear cover 18. The front cover 12 and the rear cover 18 are assembled to each other, and the touch panel 11 and the display panel 16 are disposed between the front cover 12 and the rear cover 18. The front cover 12 protrudes and covers the rim of the touch panel 11, and the display panel 16 is placed below the touch panel 11. The touch panel 11 comprises a touch panel body 111 and a flexible printed circuit (FPC) 14. The flexible printed circuit 14 connects the touch panel body 111 and a main circuit board (not shown) for signal transmission. Moreover, to prevent the flexible printed circuit 14 from being exposed to the user, the front cover 12 covers the flexible printed circuit 14 and some part of the touch panel body 111. As a result, the front cover 12 sticks out from the touch panel body 111.

Due to the design of the bulged front cover 12, the user 15 is limited by the front cover 12 when operating the touch panel body 111. The border of the touch panel body 111 (i.e., the area of the touch panel body 111 connected to the front cover 12) is not easily accessed, causing non-user-friendly operation and uncomfortable operation feeling, and the border tends to become dirty because it is not easily cleaned.

SUMMARY OF THE INVENTION

The present invention provides a handheld electronic apparatus and the touch panel thereof. The front cover and the touch panel of the handheld electronic apparatus are assembled, so that the front cover will not stick out from the touch panel. Accordingly, the problem of the difficult operation of the touch panel border can be resolved, thereby providing the user a better operation feeling.

The touch panel of the handheld electronic apparatus has a notch configured to accommodate one end of the flexible printed circuit connected to the touch panel body. When the touch panel is assembled with the front cover, the flexible printed circuit can extend in a curved manner through the notch. Therefore, the flexible printed circuit will not be bent perpendicularly or with a sharp angle, thereby increasing the lifetime of the flexible printed circuit.

A handheld electronic apparatus comprises a front cover, a touch panel and a display panel. The front cover has a support portion with a first opening. The touch panel is placed on the support portion and covers the first opening. The touch panel comprises a touch panel body and a flexible printed circuit, in which the flexible printed circuit is connected to the touch panel body. The touch panel body comprises a first substrate, a first transparent conductive layer, a second transparent conductive layer, a second substrate and multiple spacers. The first substrate is placed on the support portion and covers the first opening, and the first substrate has a notch. The first transparent conductive layer is placed on the first substrate. The second transparent conductive layer is placed above the first transparent conductive layer. The second substrate is placed on the second transparent conductive layer. The spacers are placed between the first transparent conductive layer and the second transparent conductive layer. The flexible printed circuit has an end placed between the first transparent conductive layer and the second transparent conductive layer, and is electrically connected to the first transparent conductive layer and the second transparent conductive layer. The flexible printed circuit extends in a curved manner, and a part of the flexible printed circuit is received in the notch. The display panel is placed below the touch panel body.

DETAILED DESCRIPTION OF THE INVENTION

The present invention provides a handheld electronic apparatus and the touch panel thereof to resolve the non-user-friendly operation problem at the border of the touch panel and to provide better operation feeling. The invention is described in detail below with reference to drawings.

Figure 1:
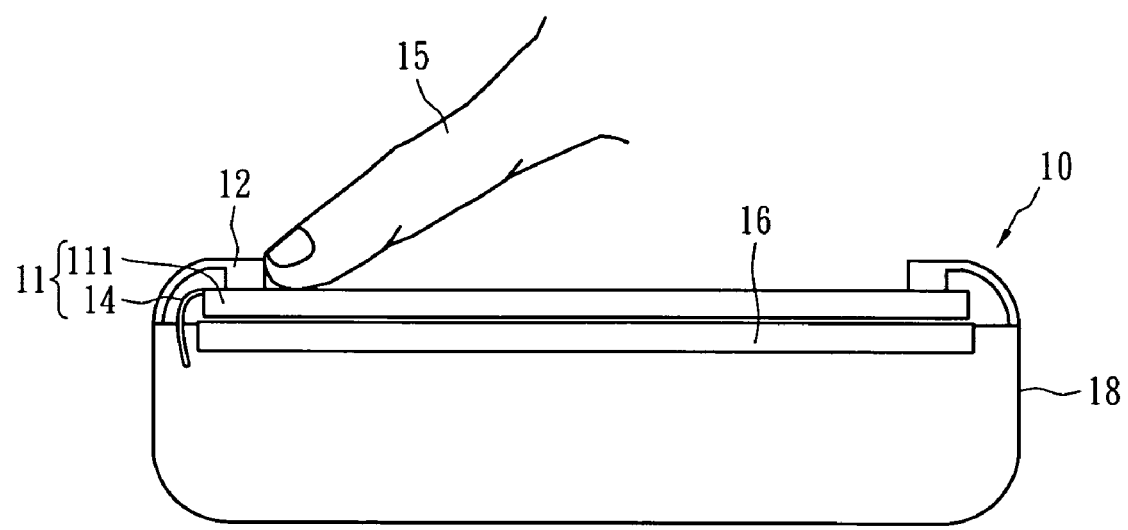
FIG. 1 is an illustration showing a cross-sectional view of a cellular phone with a traditional touch panel.
Figure 2:
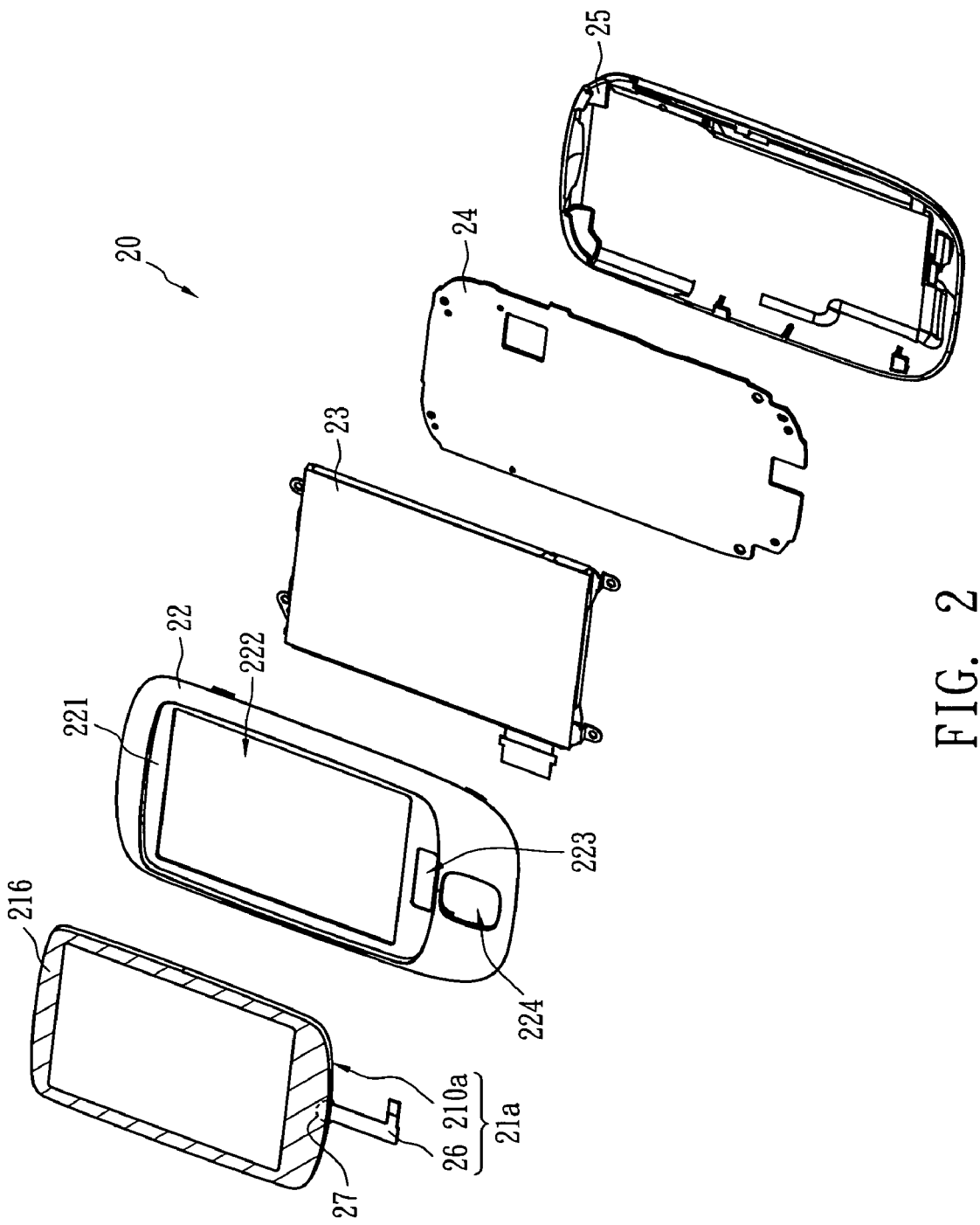
FIG. 2 is an explosive illustration showing the handheld electronic apparatus in accordance with an embodiment of the present invention.
Figure 3:
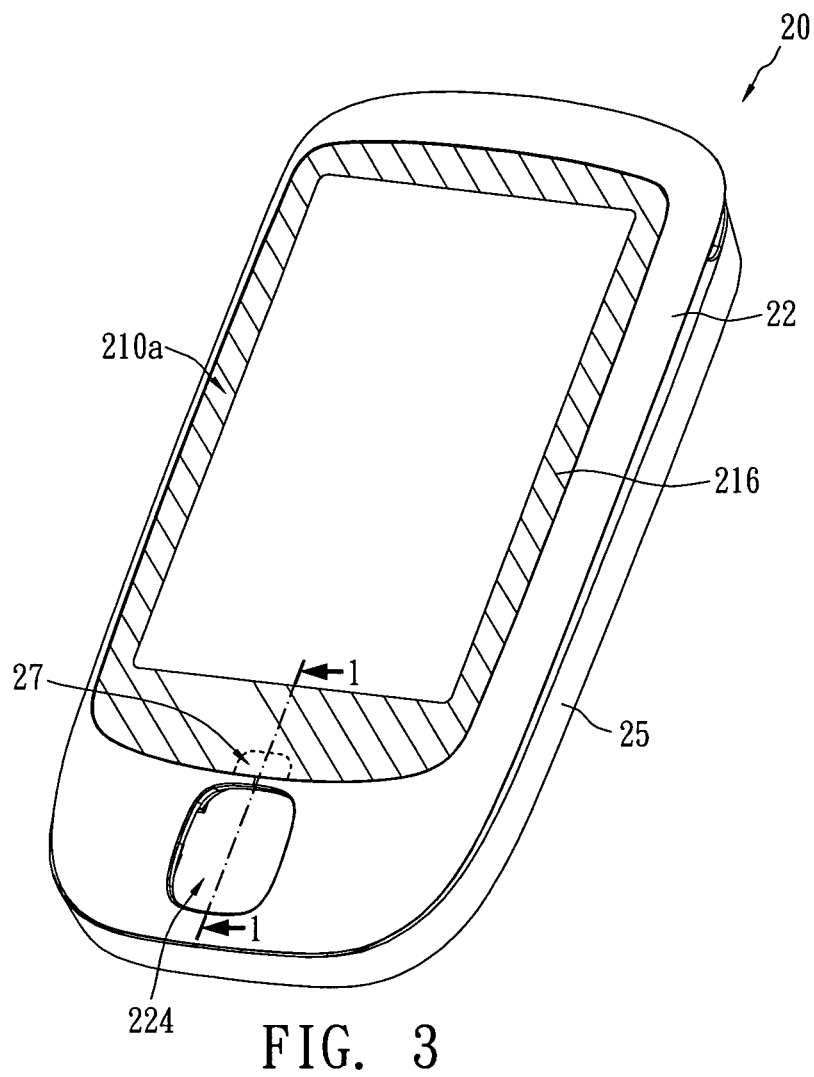
FIG. 3 is an illustration showing the handheld electronic apparatus in accordance with an embodiment of the present invention.

FIG. 2 is an illustration of a handheld electronic apparatus 20 with separated components, and FIG. 3 illustrates the handheld electronic apparatus 20 after assembly. The handheld electronic apparatus of the present invention may be a PDA, a cellular phone, a smart phone or other electronic apparatus having a touch panel. The handheld electronic apparatus 20 comprises a touch panel 21a, a front cover 22, a display panel 23, a main circuit board 24 and a rear cover 25. The front cover 22 comprises a support portion 221, and the support portion 221 has a first opening 222 and a second opening 223. The touch panel 21a is placed on the support portion 221 and covers the first opening 222. The touch panel 21a comprises a touch panel body 210a and a flexible printed circuit 26, in which the border of the touch panel body 210a and the front cover 22 substantially form coplanar, and the flexible printed circuit 26 is connected to the touch panel body 210a. The flexible printed circuit 26 penetrates the second opening 223, and can be connected to the display panel 23 or directly connected to the main circuit board 24 as desired to transmit the signals inputted from the touch panel body 210a to the main circuit board 24 for signal processing. Moreover, the first opening 222 and the second opening 223 can be connected. The front cover 22 has a third opening 224 adjacent to the second opening 223, and the third opening 224 is configured to expose a navigator key (not shown). The display panel 23 is placed below the touch panel body 210a. The rear cover 25 can be assembled with the front cover 22 to accommodate the display panel 23 and the main circuit board 24. In this embodiment, the touch panel body 210a has a notch 27 at the bottom surface thereof to accommodate one end of the flexible printed circuit 26. The notch 27 is described in detail as follows with reference to the cross-sectional view shown in FIG. 4.

Figure 4:
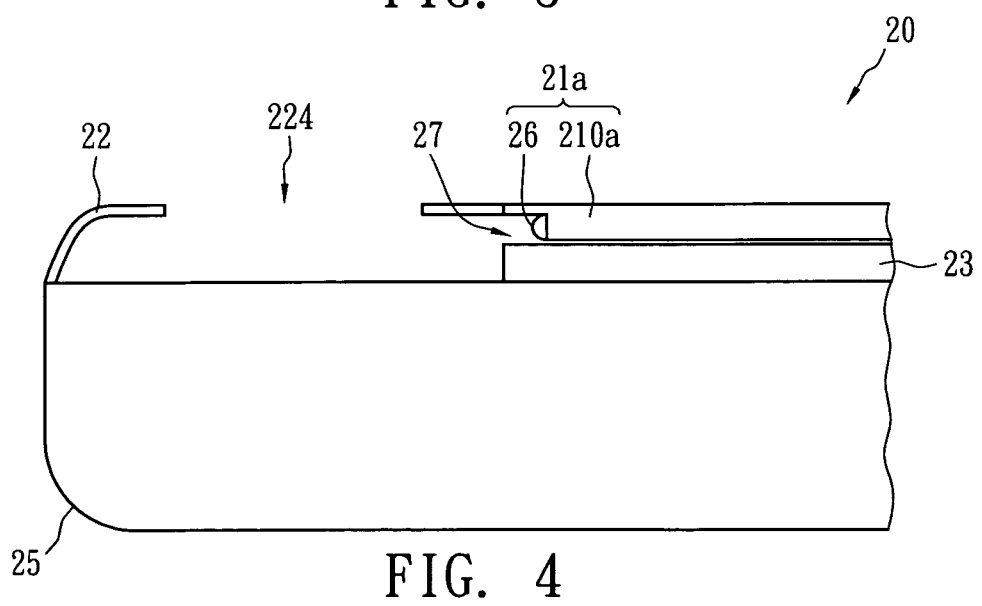
FIG. 4 is a cross-sectional view along line 1-1 in FIG. 3.

FIG. 4 is a cross-sectional view along line 1-1 of FIG. 3. With traditional handheld electronic apparatus, the front cover sticks out from the touch panel body, whereas for the present invention the front cover 22 and the touch panel body 210a of the handheld electronic apparatus 20 form coplanar after assembly, i.e., the front cover 22 and the border of the touch panel body 210a are substantially on the same level. The touch panel body 210a has a notch 27 at the bottom surface of one end thereof, so as to accommodate a portion of the flexible printed circuit 26 and allow the flexible printed circuit 26 to extend in a curved manner. In this embodiment, the flexible printed circuit 26 is bent and connected to the display panel 23. In practice, the flexible printed circuit 26 can also be connected to the main circuit board 24 directly for signal transmission.

When the front cover 22 and the border of the touch panel body 210a are on the same level, the end of the touch panel body 210a connected to the flexible printed circuit 26 would substantially abut against the front cover 22 if there were no notch 27. In such case, the flexible printed circuit 26 would have to be perpendicularly bent downwards so as to be electrically in connection with the main circuit board 24, and as a consequence the lifetime of the flexible printed circuit 26 would be impacted. The notch 27 of the present invention, in contrast, allows for a gently curved extension of the flexible printed circuit 26, thereby avoiding the lifetime reduction problem caused by the sharp bending of the flexible printed circuit 26. The details of the touch panel 21a are described below.

Figure 5:
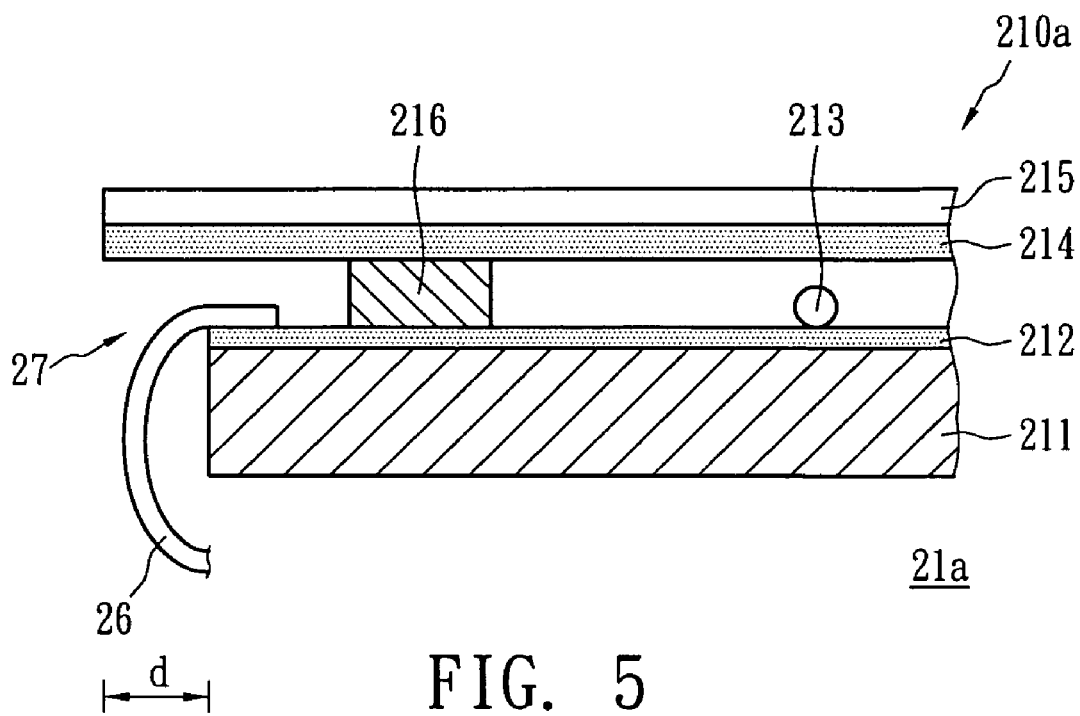
FIG. 5 is a cross-sectional view showing the touch panel in accordance with the first embodiment of the present invention.

FIG. 5 illustrates a cross-sectional view of a touch panel in accordance with a first embodiment of the present invention, which is a resistive touch panel of a film/glass type. The touch panel 21a is a multi-layer structure, and comprises a touch panel body 210a and a flexible printed circuit 26. The flexible printed circuit 26 is connected to the touch panel body 210a. The touch panel body 210a comprises a first substrate 211, a first transparent conductive layer 212, a plurality of spacers 213, an insulation layer 216, a second transparent conductive layer 214 and a second substrate 215. The first substrate 211 is placed on the support portion 221 and covers the first opening 222, and the first substrate 211 has a notch 27. The first transparent conductive layer 212 is placed on the first substrate 211. The second transparent conductive layer 214 is placed above the first transparent conductive layer 212, and is separated from the first transparent conductive layer 212 by the insulation layer 216 and the plurality of spacers 213. The insulation layer 216 is of a rectangle ring structure (as shown in FIG. 2) and surrounds the spacers 213. The second substrate 215 is disposed on the second transparent conductive layer 214.

In this embodiment, the first substrate 211 may be a plastic or glass substrate, whereas the second substrate 215 can be made of plastic such as poly (ethylene terephthalate) (PET) or the like. Moreover, when the first substrate 211 is a plastic substrate, the rigidity of the second substrate 215 is less than that of the first substrate 211. The first and second transparent conductive layers 212 and 214 may be selected from the group consisting of indium tin oxide (ITO), indium zinc oxide (IZO), aluminum doped zinc oxide (AZO), cadmium tin oxide (CTO), zinc oxide (ZnO) and zirconium dioxide ($ZrO_2$) or other transparent materials. The above materials are exemplified and not limited, and other materials having the same or similar properties also can be used. Moreover, the first transparent conductive layer 212 can be formed on the first substrate 211 by sputtering process, and the second transparent conductive layer 214 can be formed on the second substrate 215 by sputtering process also. If the first substrate 211 is a glass substrate, and the first transparent conductive layer 212 is made of ITO, those having ordinary knowledge in the art would refer to this bi-layer structure as an ITO glass. Moreover, if the second substrate 215 is made of PET and the second transparent conductive layer 214 is made of ITO, those having ordinary knowledge in the art would identify this bi-layer structure as an ITO film. As a result, the touch panel 21a of FIG. 5 can be called a resistive touch panel of a film/glass type.

The first substrate 211 and the first transparent conductive layer 212 retract at one end and are connected to the flexible printed circuit 26. In other words, the first substrate 211 and the first transparent conductive layer 212 are shorter than the second transparent conductive layer 214 and the second substrate 215. One end of the flexible printed circuit 26 is placed between the first transparent conductive layer 212 and the second transparent conductive layer 214, and is electrically connected to the first transparent conductive layer 212 and the second transparent conductive layer 214. The flexible printed circuit 26 extends downwardly in a curved manner, and a part of the flexible printed circuit 26 is accommodated in the notch 27. Furthermore, the second transparent conductive layer 214 is placed above the notch 27, and the rim of the first substrate 211 and the rim of the first transparent conductive layer 212 at the notch 27 are aligned.

Noted that although the flexible printed circuit 26 in FIG. 5 is connected to the first transparent conductive layer 212, anyone having ordinary knowledge in the art can understand that the second transparent conductive layer 214 is connected to the flexible printed circuit 26 by soldering, applying conductive glue or other jump manners.

Figure 6:
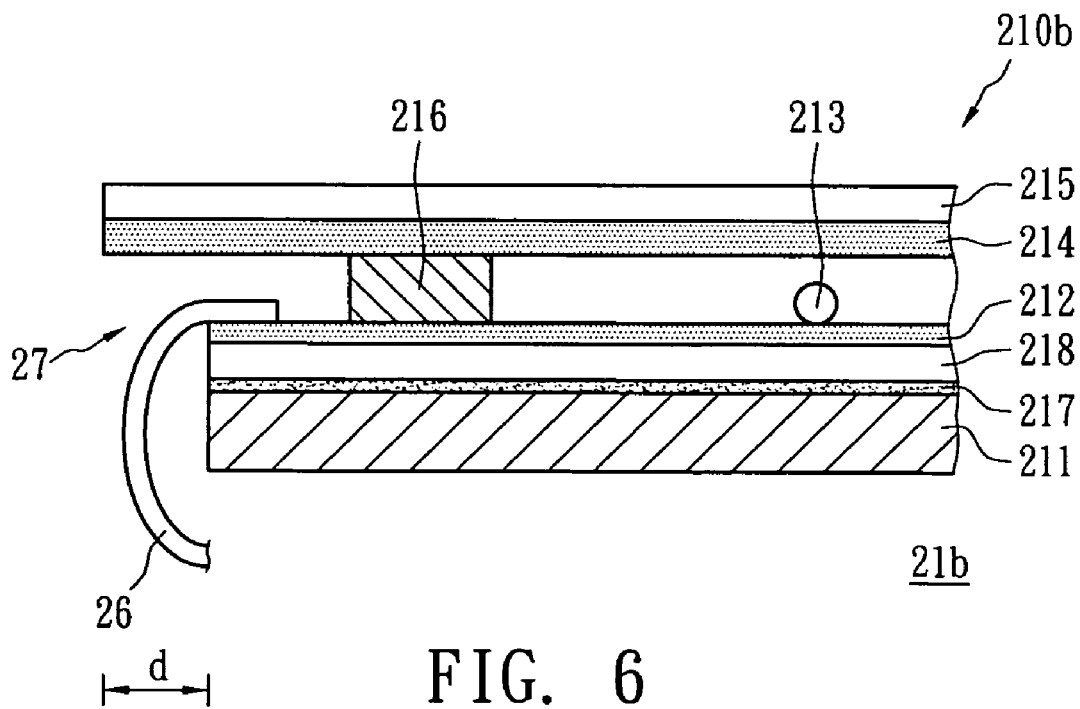
FIG. 6 is a cross-sectional view showing the touch panel in accordance with the second embodiment of the present invention.

FIG. 6 is a cross-sectional view of the touch panel in accordance with a second embodiment of the present invention, which is of the so-called film/film/glass type. The touch panel 21b comprises a touch panel body 210b and a flexible printed circuit 26. The flexible printed circuit 26 is connected to the touch panel body 210b. The touch panel body 210b comprises a first substrate 211, a glue layer 217, a third substrate 218, a first transparent conductive layer 212, an insulation layer 216, multiple spacers 213, a second transparent conductive layer 214 and a second substrate 215. In comparison with the embodiment shown in FIG. 5, the third substrate 218 is further formed between the first substrate 211 and the first transparent conductive layer 212, and the third substrate 218 is glued to the first substrate 211 by the glue layer 217.

More particularly, the bi-layer structure of the first transparent conductive layer 212 and the third substrate 218 is similar to the bi-layer structure of the second transparent conductive layer 214 and the second substrate 215. In other words, the third substrate 218 may be a plastic substrate, and can be made of PET or the like. If the third substrate 218 is made of PET and the first transparent conductive layer 212 is made of ITO, those having ordinary knowledge in the art would refer to this bi-layer structure as an ITO film. The ITO film is connected to the first substrate 211 by the glue layer 217. Consequently, the touch panel 21b of FIG. 6 is called a resistive touch panel of a film/film/glass type.

For manufacturing, a portion of the first substrate 211 and a portion of the first transparent conductive layer 212 shown in FIG. 5 are removed or stripped to form the notch 27, whereas the rims of the first substrate 211, the glue layer 217, the third substrate 218 and the first transparent conductive layer 212 shown in FIG. 6 are all removed at one time to form the notch 27. In practice, other methods can also be used to form the notch 27. Alternatively, a portion of the first substrate 211 can be removed to form the notch 27 first, and then the third substrate 218 and the first transparent conductive layer 212 are assembled to the first substrate 211 by the glue layer 217. For such case, the rim of the third substrate 218 and the rim of the first transparent conductive layer 212 are not aligned with the rim of the first substrate 211 at the notch 27. Accordingly, the third substrate 218 can cover a portion of the notch 27.

In the above embodiments, the bending radius of the flexible printed circuit 26 may be between 0.2 and 1.5 mm, or the longitudinal depth along the extension direction of the flexible printed circuit 26 (i.e., the width "d" of the notch 27 shown in FIG. 5 and FIG. 6) may be between 0.2 and 1.5 mm. In consideration of the limitation of the bending radius of the flexible printed circuit 26, those having ordinary knowledge in the art can determine the size of the notch 27 of the first substrate 211 based on the disclosure of the above embodiments. Moreover, the notch 27 is not necessarily placed at the center of a side of the first substrate 211; other positions may be acceptable also.

To sum up, the first substrate of the touch panel has a notch; therefore if the touch panel is applied to a handheld electronic apparatus having flat upper surface, the extension of the flexible printed circuit will not be too-sharply bent which could decrease the lifetime.

The above-described embodiments of the present invention are intended to be illustrative only. Numerous alternative embodiments may be devised by those skilled in the art without departing from the scope of the following claims.

What is claimed is:

1. A handheld electronic apparatus, comprising:
   a front cover comprising a support portion, wherein the support portion has a first opening, and a second opening;
   a touch panel placed on the support portion and covering the first opening, the touch panel comprising:
   a touch panel body, wherein the touch panel body comprises:
   a first substrate placed on the support portion and covering the first opening, with the first substrate having a notch;
   a first transparent conductive layer placed on the first substrate;
   a second transparent conductive layer placed above the first transparent conductive layer;
   a second substrate placed on the second transparent conductive layer;
   a plurality of spacers placed between the first transparent conductive layer and the second transparent conductive layer;
   an insulation layer placed between the first transparent conductive layer and the second transparent conductive layer, the insulation layer surrounds the plurality of spacers, and the insulation layer is away from the notch; and
   a flexible printed circuit connected to the touch panel body, wherein one end of the flexible printed circuit is placed between the first transparent conductive layer and the second transparent conductive layer, the flexible printed circuit is electrically connected to the first transparent conductive layer and the second transparent conductive layer, the flexible printed circuit extends in a curved manner and a portion of the flexible printed circuit is accommodated in the notch, and the flexible printed circuit penetrates through the second opening formed on the support portion; and
   a display panel placed below the touch panel body.

2. The handheld electronic apparatus of claim 1, wherein a border of the touch panel body and the front cover are substantially at the same level.

3. The handheld electronic apparatus of claim 1, wherein the front cover further comprises a third opening adjacent to the second opening, and the third opening is configured to expose a guide key.

4. The handheld electronic apparatus of claim 1, wherein the touch panel body further comprises:
   a glue layer placed on the first substrate; and
   a third substrate placed between the glue layer and the first transparent conductive layer.

5. The handheld electronic apparatus of claim 1, further comprising a main circuit board electrically connected to another end of the flexible printed circuit.

6. The handheld electronic apparatus of claim 1, further comprising a rear cover assembled with the front cover to accommodate the display panel.

7. The handheld electronic apparatus of claim 1, wherein the first substrate comprises glass or plastic.

8. The handheld electronic apparatus of claim 1, wherein the flexible printed circuit has a bending radius between 0.2 and 1.5 mm.

9. The handheld electronic apparatus of claim 1, wherein the notch has a longitudinal depth between 0.2 and 1.5 mm along an extension direction of the flexible printed circuit.

10. A touch panel, comprising:
    a touch panel body, comprising:
    a first substrate having a notch;
    a first transparent conductive layer placed on the first substrate;
    a second transparent conductive layer placed above the first transparent conductive layer;
    a second substrate placed on the second transparent conductive layer;
    a plurality of spacers placed between the first transparent conductive layer and the second transparent conductive layer;
    an insulation layer placed between the first transparent conductive layer and the second transparent conductive layer, the insulation layer surrounds the plurality of spacers, and the insulation layer is away from the notch; and
    a flexible printed circuit connected to the touch panel body, wherein one end of the flexible printed circuit is placed between the first transparent conductive layer and the second transparent conductive layer, the flexible printed circuit is electrically connected to the first transparent conductive layer and the second transparent conductive layer, the flexible printed circuit extends in a curved manner, a portion of the flexible printed circuit is accommodated in the notch, and the flexible printed circuit penetrates through a second opening.

11. The touch panel of claim 10, wherein the touch panel body further comprises:
    a glue layer placed on the first substrate; and
    a third substrate placed between the glue layer and the first transparent conductive layer.

12. The touch panel of claim 10, wherein the first substrate comprises glass or plastic.

13. The touch panel of claim 10, wherein the flexible printed circuit has a bending radius between 0.2 and 1.5 mm.

14. The touch panel of claim 10, wherein the notch has a longitudinal depth along an extension direction of the flexible printed circuit between 0.2 and 1.5 mm.

15. The touch panel of claim 10, wherein the first and second transparent conductive layers are made of a material selected from the group consisting of indium tin oxide, indium zinc oxide, aluminum doped zinc oxide, cadmium tin oxide, zinc oxide and zirconium dioxide.

* * * * *